M. S. Tuck.
Hay Fork.
No. 64462.
Patented May. 7. 1867.
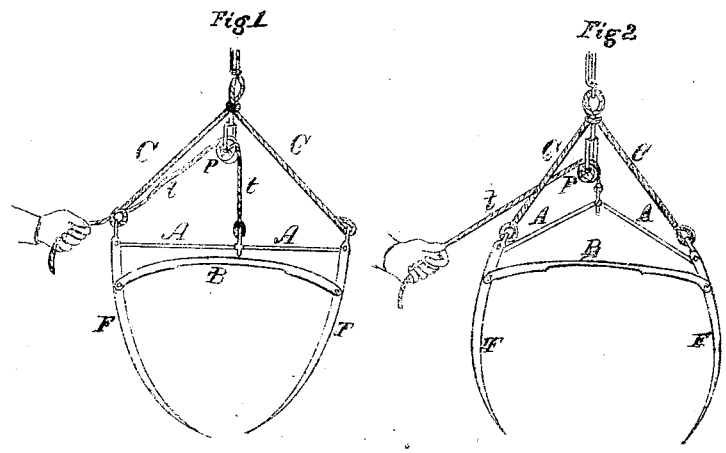
Witnesses
Charles L. DuBois
Charles Herzog
Inventor
Maynard S Tuck

United States Patent Office.

MYNARD I. TURCK, OF SCHODACK, NEW YORK.

Letters Patent No. 64,462, dated May 7, 1867.

IMPROVEMENT IN HORSE HAY-FORKS.

The Schedule referred to in these Letters Patent and making part of the same.

TO ALL WHOM IT MAY CONCERN:

Be it known that I, MYNARD I. TURCK, of Schodack, in the county of Rennselaer, and State of New York, have invented a new and useful Improvement in Hay-Forks; and I do hereby declare that the following is a full, clear, and exact description of the construction and operation of the same, reference being had to the accompanying drawings, making a part of this specification, in which—

Figure 1 shows the position of the several parts when holding the hay; and
Figure 2 shows the position of the several parts when the hay is discharged.

F F are the tines of the fork in the usual form; B, the brace or cross-bar; A A, the jointed cross-bar; P, the pulley; C C, the lifting ropes; and $t$ the tripping cord.

The operation of the fork is as follows: When the tines F F are forced in the hay their whole length the points come together, as shown in fig. 1, and the jointed cross-bar A A drops down to a horizontal position, forcing the upper end of the tines apart, and bringing the points together, and holding them in that position until it is desired to discharge the hay. As the hay is drawn up to the required height by the lifting ropes C C, and it is required to drop the hay, the operator pulls the trip cord $t$, and the jointed cross-bar A A is drawn up, as shown in fig. 2, the tines spread apart, and the hay is released. The tines may be divided into any number of prongs, or otherwise formed, so as to be applied to the raising of other heavy weights, such as bales, boxes, barrels, or any bulky merchandise.

What I claim as my invention, and desire to secure by Letters Patent, is—

The arrangement and combination of the jointed cross-bar A A, tines F F, cross-bar B, trip cord $t$, and pulley P, substantially as and for the purposes herein set forth.

MYNARD I. TURCK.

Witnesses:
CHARLES L. DU BOIS,
EDM. F. BROWN.